United States Patent [19]

Barnhardt

[11] Patent Number: 4,851,723
[45] Date of Patent: Jul. 25, 1989

[54] COOLANT PUMP SYSTEM FOR VARIABLE SPEED GENERATORS

[75] Inventor: Scott B. Barnhardt, Shawnee Township, Allen County, Ohio

[73] Assignee: Westinghouse Electric Corp., Pittsburgh, Pa.

[21] Appl. No.: 226,702

[22] Filed: Aug. 1, 1988

[51] Int. Cl.$^4$ .................. H02K 9/19; F04B 49/00; G04C 2/344
[52] U.S. Cl. ................................. 310/54; 310/64; 418/31
[58] Field of Search ............... 310/53, 54, 64, 68 B; 418/26, 27, 31

[56] References Cited

U.S. PATENT DOCUMENTS

| | | | |
|---|---|---|---|
| 3,771,921 | 11/1973 | Rhode et al. | 418/31 |
| 3,784,326 | 1/1974 | Lagana et al. | 418/26 |
| 3,807,912 | 4/1974 | Keller | 418/31 |
| 3,808,814 | 5/1974 | Macy, II | 418/31 |
| 3,824,045 | 6/1974 | Wisniewski et al. | 418/30 |
| 3,898,021 | 8/1975 | Barneoud-Arnoulet | 418/31 |
| 3,918,855 | 11/1975 | Bornholdt | 418/24 |
| 4,110,643 | 8/1978 | Müller | 310/54 |
| 4,259,039 | 3/1981 | Arnold | 418/26 |
| 4,284,913 | 8/1981 | Barnhardt | 310/54 |
| 4,348,159 | 9/1982 | Acheson | 418/26 |
| 4,538,974 | 9/1985 | Stich et al. | 418/26 |
| 4,554,501 | 11/1985 | Baker | 322/14 |
| 4,780,643 | 10/1988 | Dantlgraber et al. | 418/31 |

FOREIGN PATENT DOCUMENTS 2219964 4/1972 Fed. Rep. of Germany.

OTHER PUBLICATIONS

Bagat, A. and Orban, P., "Pump Controls Finesse Brute-Force Design," pp. 53-56, Hydraulics and Pneumatics, May 1985.

Primary Examiner—Patrick R. Salce
Assistant Examiner—D. L. Rebsch
Attorney, Agent, or Firm—R. P. Lenart

[57] ABSTRACT

A coolant pump system for a variable speed generator includes a variable displacement pump mounted within the generator and coupled to the generator rotor such that the pump is driven at a speed proportional to the rotational speed of the generator rotor. The displacement of the pump is controlled by moving a pump stator with respect to the pump rotor. A spring positioned between the generator housing and the pump stator provides a biasing force which tends to move the pump stator in a direction that increase displacement of the pump. Back pressure in the coolant system is used to provide a force which tends to move the pump stator in a direction that decreases the pump displacement as the back pressure increases. An additional force on the pump stator which tends to further reduce pump displacement is electromagnetically controlled in response to the electrical load placed on the generator and/or the speed of the generator rotor. This additional force increases as rotor speed increases or electrical load decreases, thereby decreasing displacement of the pump.

12 Claims, 1 Drawing Sheet

COOLANT PUMP SYSTEM FOR VARIABLE SPEED GENERATORS

BACKGROUND OF THE INVENTION

This invention relates to coolant systems for electric generators, and more particularly, to such systems for use in variable speed generators.

One type of aircraft electrical power generating system includes a generator which is coupled to an aircraft engine and driven at a variable speed. The AC output of the generator is rectified and feed to a pair of DC link conductors. An inverter receives voltage from the DC link conductors and produces a constant frequency AC output. A generator control unit senses voltage at some point in the system and adjusts the excitation current to the generator such that the generator output voltage is maintained within a predetermined range for various load conditions.

Certain electrical generators used in such variable speed constant frequency power systems utilize spray oil cooling. A coolant pump, which may be contained within the generator housing, operates at speeds which are proportional to the input speeds of the generator. This pump is driven either directly by the generator rotor shaft or through reduction gearing. Typically, gear rotor or vane type positive displacement pumps are used. These types of pumps have a power drain which is proportional to the product of rotational speed and back pressure of the coolant. The back pressure rises with increasing flow through orifices feeding the rotor, and the flow increases with speed. A pressure relief valve is required to reduce pump back pressure as speed increases.

The kinetic energy of the oil fed to the rotor also increases with speed and is lost when the oil is released to the generator case. This results in increased kinetic energy loss. Windage and churning losses also increase with speed, as does the erosion of insulation. Since load excitation losses, which are greatest in the rotating field, decrease as generator speed increases, the increased coolant flow and associated losses are wasted. It is therefore desirable to design a coolant system for a variable speed generator which can supply sufficient coolant at various operating speeds, while at the same time, minimizing losses over the operating speed range.

SUMMARY OF THE INVENTION

This invention provides a coolant pump system for an oil-cooled generator, having a generator housing and rotor mounted for rotation at a variable speed with respect to the housing, which includes a variable displacement pump mounted within the generator housing and mechanically coupled to the rotor such that the pump is driven at a speed proportional to the rotating speed of the generator rotor. The pump is of the rotary vane type and includes a pump rotor mounted for rotation on an axis which is fixed with respect to the generator housing. A pump stator defines a generally cylindrical opening for receiving the pump rotor and includes an inlet port for receiving coolant from an external hydraulic circuit and an outlet port for delivering coolant to the external circuit. The pump stator is movable with respect to the pump rotor axis to increase or decrease displacement of the pump. A biasing force is applied to the pump stator in a first direction, thereby tending to increase the displacement of the pump. A second force is applied to the pump stator in a second (opposite) direction in response to the pressure of coolant in one of the coolant passages, thereby tending to reduce the displacement of the pump as the pressure in the coolant passage increases. A third force is also applied to the pump stator in the second direction in response to a control signal which increases with increasing electrical load on the generator. This third force also tends to reduce the displacement of the pump as the electrical load on the generator decreases.

The present invention also encompasses the method of controlling the flow of coolant in a variable speed generator performed by the above-described pump system. In an alternative embodiment, the speed of the generator can also be monitored and the third force can also be responsive to generator speed, so that the displacement of the pump is reduced as the speed of the generator increases.

By providing a coolant pump in accordance with this invention, as the generator speed increases the pump back pressure, which rises only slightly, causes movement of the pump stator for lower displacement per revolution, thereby using less power than present systems. This action also eliminates the need for a pressure relief valve. When the generator load is reduced and/or generator speed increases, the pump stator is additionally adjusted to provide lower displacement per revolution, reducing the required pump power even further. By using a spring to provide a biasing force that urges the pump stator toward full displacement, adequate cooling is assured in the event of a failure in any or all of the pump displacement control devices.

BRIEF DESCRIPTION OF THE DRAWINGS

The invention will become more readily apparent from the following description of the preferred embodiment thereof, shown by way of example only, in the accompanying drawings wherein.

DESCRIPTION OF THE PREFERRED EMBODIMENT

Figure 1:
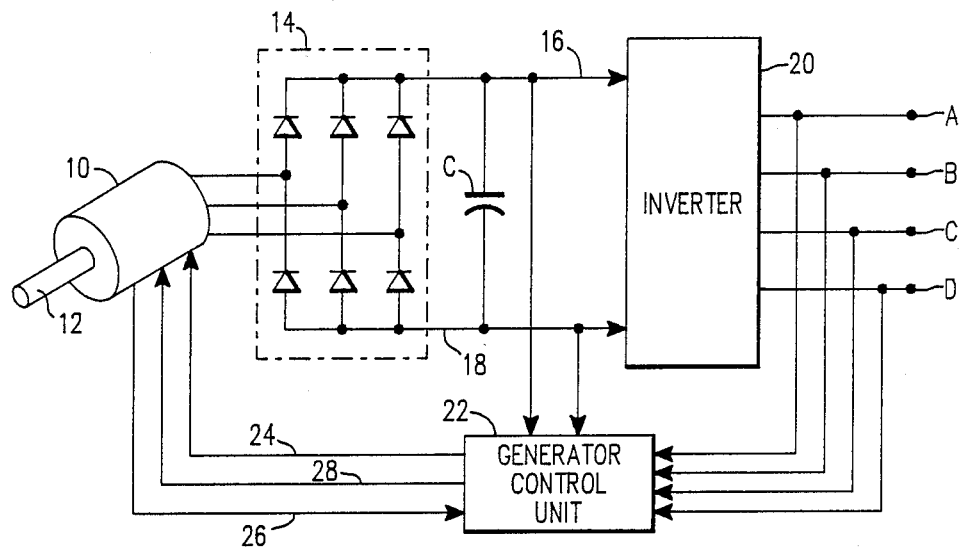
FIG. 1 is a schematic diagram of a variable speed constant frequency power system which includes a generator having a coolant pump system constructed in accordance with the present invention.

Referring to the drawings, FIG. 1 is a schematic diagram of a variable speed constant frequency power generating system including a generator having a coolant system constructed in accordance with the present invention. The generator 10 has an input shaft 12 which would be connected to be driven by a variable speed external prime mover, not shown, such as an aircraft engine. The AC output of the generator is rectified by a bridge 14 to produce a DC voltage on a pair of DC link conductors 16 and 18. Inverter 20 receives this DC voltage and produces a constant frequency AC output on lines A, B, C and D. A generator control unit 22 senses the DC link voltage and the inverter output voltage and adjusts the generator exciter field current by way of line 24 to maintain the output of the generator within a preselected voltage range. The generator control unit also senses the speed of the generator via line 26 and produces a pump displacement control signal on line 28 which varies with the exciter field current or the generator speed or both. The generator speed sensing and exciter field current sensing performed by the generator control unit 22 is accomplished in accordance with known techniques, and the exact method of sensing speed or exciter field current does not form a part of the present invention. Since generator speed and exciter field current are parameters which are normally sensed by the generator control unit, the production of a pump displacement signal on line 28 which is a function of these parameters can be easily accomplished by those skilled in the art.

Figure 2:
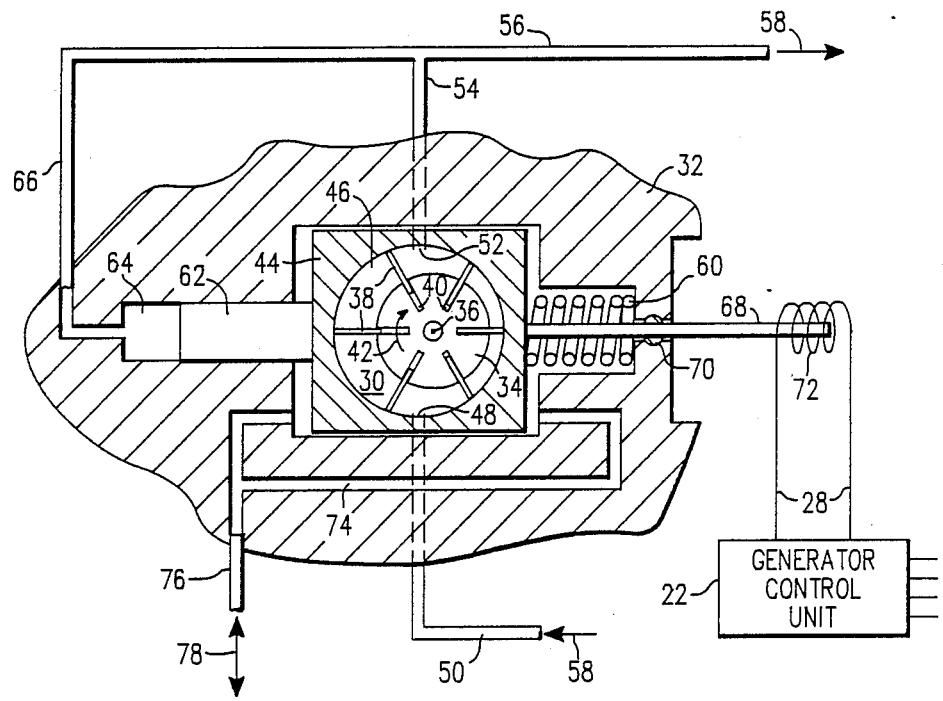
FIG. 2 is a schematic representation of a coolant pump system constructed in accordance with one embodiment of this invention.

FIG. 2 is a schematic representation of a coolant pump system constructed in accordance with one embodiment of the present invention. The system includes a variable displacement vane-type pump 30 mounted within a generator housing 32. The pump includes a pump rotor 34 mounted for rotation about an axis 36 that is fixed with respect to the generator housing. The pump rotor includes a plurality of vanes 38 positioned in slots 40 such that the vanes are free to move in a radial direction as the pump rotor turns in the direction indicated by arrow 42. The pump also includes a stator 44 defining a generally cylindrical opening 46 for receiving the pump rotor. The pump stator further includes an inlet port 48 for receiving cooling oil from a coolant passage 50 which forms part of an external hydraulic circuit. An outlet port 52 is connected to coolant passage 54 such that the flow of coolant in the external hydraulic circuit 56 is illustrated by arrows 58.

A spring 60 is positioned between the pump stator and the generator housing to exert a force which tends to move the pump stator toward the left, thereby increasing displacement of the pump. A piston 62 is positioned on the opposite side of the pump stator in slot 64. Coolant passage 66 connects slot 64 with coolant passage 54 such that back pressure in passage 54 exerts a force on piston 62 thereby tending to move the pump stator to the right and reducing the displacement of the pump as the back pressure increases. In a practical system, it is anticipated that the pressure rise in passage 54 will be insufficient to produce the desired decrease in pump displacement for increased pump rotor speed. Therefore, a control rod 68 is connected to the pump stator and passes through a seal 70 in the generator housing. When the load on the generator decreases as sensed by the generator control unit 22, and/or the speed of the generator increases as sensed by generator control unit 22, a pump displacement control signal on lines 28 energizes solenoid 72 to move the control rod 68 and the pump stator 44 toward the right, thereby further reducing the displacement of the pump as the electrical load on the generator decreases and/or the speed of the generator increases. Therefore, the spring 60 exerts a force on the pump stator which is the sum of the force produced by the back pressure in coolant passage 54 plus the control rod force.

Coolant passageway 74 is connected to a coolant sump by way of passage 76 and serves to prevent the formation of a hydraulic pressure differential across the pump stator. Coolant flows into or out of these passages as necessary as indicated by arrows 78.

It should be apparent to those skilled in the art that the described coolant pump system controls the flow of coolant in a variable speed electrical generator by applying forces to a pump stator to control the displacement of the pump, thereby providing the required coolant flow. A spring is used to apply a biasing force to the pump stator which tends to increase the pump displacement to its maximum value and would assure an adequate flow of coolant in the event of a failure of the other pump displacement control mechanisms. Back pressure in the coolant system is used to provide partial control of the pump displacement in that the displacement is reduced as back pressure increases. Additional control of the pump displacement is provided by an actuating rod and solenoid with the solenoid being energized by a pump displacement control signal that is responsive to generator electrical load and/or generator speed so that the pump displacement is further decreased with decreased electric load or increased speed.

Although the present invention has been described in terms of what is at present believed to be its preferred embodiment it will be apparent to those skilled in the art that various changes may be made without departing from the scope of the invention. It is therefore intended that the following claims cover such changes.

What is claimed is:

1. A coolant pump system for an oil cooled generator, having a generator housing and a generator rotor mounted for rotation at a variable speed with respect to said housing, said pump system comprising:
   a variable displacement pump mounted within said generator housing and mechanically coupled to said generator rotor such that said pump is driven at a speed proportional to the rotational speed of said generator rotor, said pump including a pump rotor mounted for rotation on an axis which is fixed with respect to said generator housing, a plurality of sliding vanes extending radially outward from said pump rotor, a pump stator defining a generally cylindrical opening for receiving said pump rotor, said opening having an inlet port for receiving coolant from an external hydraulic circuit and an outlet port for delivering coolant to said external hydraulic circuit, said pump stator being moveable with respect to said axis in first and second directions perpendicular to said axis, such that movement of said pump stator in said first direction increases the displacement of said pump and movement of said pump stator in said second direction decreases the displacement of said pump;
   means for applying a first force to said pump stator in said first direction, thereby tending to increase the displacement of said pump;
   a plurality of coolant passages in said generator housing connected to receive coolant from said pump;
   means for applying a second force to said pump stator in said second direction in response to a pressure of said coolant in one of said coolant passages, thereby tending to reduce the displacement of said pump as said pressure increases;
   means for producing a control signal which is a function of the electrical load on the generator; and
   means for applying a third force to said pump stator in said second direction in response to said control signal, thereby further tending to reduce the displacement of said pump as the electrical load on said generator decreases.

2. A coolant system as recited in claim 1, further comprising:
   means for producing a second control signal which is a function of the speed of said generator; and
   wherein said means for applying a third force to said pump stator in said second direction also responds to said second control signal.

3. A coolant pump system as recited in claim 1, wherein said means for producing a control signal comprises:
   means for monitoring generator exciter field current, wherein said control signal is a function of said exciter field current.

4. A coolant pump system as recited in claim 1, wherein said means for applying a second force to said pump stator in said second direction in response to a pressure in one of said cooling passages comprises:
   a piston coupled to said pump stator for moving said pump stator in said second direction; and
   a feedback fluid path connected between said piston and said one of said cooling passages.

5. A coolant pump system as recited in claim 1, further comprising:
   means for equalizing pressure on opposite sides of said pump stator.

6. A coolant pump system as recited in claim 1, wherein said means for applying a first force to said pump stator in said first direction comprises:
   a spring positioned between said pump stator and said generator housing.

7. A coolant pump system as recited in claim 6, wherein:
   said spring exerts a force which increases with increasing back pressure of cooling oil in said one of said cooling passages.

8. A coolant pump system as recited in claim 1, wherein said means for applying a third force to said pump stator in said second direction in response to said control signal comprises:
   an actuating rod connected to said pump stator; and
   a solenoid for moving said actuating rod in said second direction in response to said control signal.

9. A coolant pump system as recited in claim 1, wherein said first and second directions are opposite to each other.

10. A method of controlling the flow of cooling oil in a variable speed, oil cooled generator comprising the steps of:
   providing a variable displacement pump mounted within a housing of a generator, said pump being mechanically coupled to a rotor of said generator such that said pump is driven at a speed proportional to the rotational speed of said generator rotor, said pump including a pump rotor mounted for rotation on an axis which is fixed with respect to said generator housing, a plurality of sliding vanes extending radially outward from said pump rotor, a pump stator defining a generally cylindrical opening for receiving said pump rotor, said opening having an inlet port for receiving coolant from an external hydraulic circuit and an outlet port for delivering coolant to said external hydraulic circuit, said pump stator being moveable with respect to said axis in first and second directions perpendicular to said axis, such that movement of said pump stator in said first direction increases the displacement of said pump and movement of said pump stator in said second direction decreases the displacement of said pump;
   applying a first force to said pump stator, said first force tending to move said pump stator in said first direction, thereby increasing the displacement of said pump;
   applying a second force to said pump stator in said second direction in response to a pressure of said coolant in one of a plurality of coolant passages in said generator housing, said second force tending to move said pump stator in said second direction, thereby reducing the displacement of said pump as said pressure increases;
   producing a control signal proportional to an electrical load on the generator; and
   applying a third force to said pump stator in said second direction in response to said control signal, said third force tending to move said pump stator in said second direction, thereby further reducing the displacement of said pump as the electrical load on the generator decreases.

11. The method of claim 10 further comprising the step of:
   producing a second control signal proportional to the speed of said generator; and
   wherein said third force is also responsive to said second control signal.

12. The method of claim 10, wherein said first and second directions are opposite to each other.

* * * * *